(12) United States Patent
Matsui

(10) Patent No.: US 7,771,785 B2
(45) Date of Patent: Aug. 10, 2010

(54) MAGNETIC FILM AND METHOD OF MANUFACTURING MAGNETIC FILM

(75) Inventor: Isao Matsui, Iruma (JP)

(73) Assignee: Kabushiki Kaisha Toshiba, Tokyo (JP)

(*) Notice: Subject to any disclaimer, the term of this patent is extended or adjusted under 35 U.S.C. 154(b) by 270 days.

(21) Appl. No.: 11/888,510

(22) Filed: Aug. 1, 2007

(65) Prior Publication Data

US 2008/0075931 A1 Mar. 27, 2008

(30) Foreign Application Priority Data

Aug. 2, 2006 (JP) .............................. 2006-211222

(51) Int. Cl.
*B32B 3/00* (2006.01)
(52) U.S. Cl. ..................................... 427/180
(58) Field of Classification Search ................. 427/180; 428/189
See application file for complete search history.

(56) References Cited

U.S. PATENT DOCUMENTS

| 6,676,729 B2* | 1/2004 | Sun .............................. 75/348 |
| 6,884,328 B2* | 4/2005 | Litvinov et al. .......... 204/192.2 |
| 2005/0266271 A1 | 12/2005 | Tsuchiya et al. ............ 428/810 |

FOREIGN PATENT DOCUMENTS

| JP | 2001-44025 | 2/2001 |
| JP | 2001-358296 | 12/2001 |
| JP | 2003155365 | 5/2003 |
| JP | 2003-289005 | 10/2003 |
| JP | 2004-111050 | 4/2004 |
| JP | 2004-145946 | 5/2004 |
| JP | 2004-311925 | 11/2004 |

OTHER PUBLICATIONS

Seki et al., Applied Physics Letters, vol. 82(2003)2461-2463.*
Y. C. Sui et al, Journal of Applied Physics, vol. 99(2006)08G704-1 to 704-3.*
T. Seki et al., Applied Physics Letters, vol. 82(2003)2461-2463.*
M. Watanabe et al, Journal of Magnetism and Magnetic Materials 177-181(1998).*
Watanabe, et al., Perpendicularly magnetized FE-Pt (001) thin films with $(B \cdot H)_{max}$ exceeding 30 MG Oe, Journal of Magnetism and Magnetic Materials, 171-181 (1998) 1231-1232.
Sun, et al., "Monodisperse FePt Nanoparticles and Ferromagnetic FePt Nanocrystal Superlattices", Science, vol. 287, Mar. 17, 2000, pp. 1989-1992.

* cited by examiner

*Primary Examiner*—Michael Cleveland
*Assistant Examiner*—Tabassom Tadayyon Eslami
(74) *Attorney, Agent, or Firm*—Ohlandt, Greeley, Ruggiero & Perle, L.L.P.

(57) ABSTRACT

A magnetic film comprises a platinum layer having a (001) plane orientation and an island-shaped iron-platinum crystalline arranged on the platinum layer and having a (001) plane orientation parallel to the (001) plane orientation of the platinum layer, wherein the island-shaped iron-platinum crystalline has a composition region consisting of 50 atomic % of each of iron and platinum and exhibits a perpendicular magnetic anisotropy having a high coercive force in a direction perpendicular to the surface of the platinum layer.

17 Claims, 2 Drawing Sheets

MAGNETIC FILM AND METHOD OF MANUFACTURING MAGNETIC FILM

CROSS-REFERENCE TO RELATED APPLICATIONS

This application is based upon and claims the benefit of priority from prior Japanese Patent Application No. 2006-211222, filed Aug. 2, 2006, the entire contents of which are incorporated herein by reference.

BACKGROUND OF THE INVENTION

1. Field of the Invention

The present invention relates to a magnetic film used as a high density recording medium and a method of manufacturing the magnetic film.

2. Description of the Related Art

In recent years, magnetic recording media are required to provide ever increasing recording densities. As a technology for achieving a high recording density, known is a so-called vertical magnetic recording medium in which, for example, magnetic crystals are separated and the magnetic recording axis is made perpendicular to the substrate surface. In the particular magnetic recording medium, the magnetic bodies are arranged independently on the substrate and the interference of the magnetic domains is suppressed so as to maintain stable the magnetic properties of each magnetic domain. As a result, it is possible to obtain the merit that the recorded information can be retained stable over a long period of time.

A conventional magnetic film is proposed in, for example, "Watanabe et al., J. Magn. Magn. Mater., 177/181, 1231 (1998)". Specifically, proposed is a magnetic film of the construction in which an Fe film and a Pt film are laminated, respectively, by the vapor deposition on a substrate of magnesia (MaO), followed by further forming an Fe—Pt thin film by the vapor deposition on the laminate film. The particular method makes it possible to form a magnetic recording medium exhibiting a strong coercive force required for the magnetic recording at a high density. In this magnetic recording medium, the crystal axis of the Fe—Pt is controlled to form an axis adapted for vertical magnetization.

On the other hand, JP-A 2003-289005 (KOKAI) teaches that a magnetic recording medium is manufactured by depositing Fe—Pt on an MgO substrate by a sputtering method so as to form a granular product on the substrate. The method disclosed in this prior art is advantageous in that it is possible to omit the step of forming Fe films and Pt films in multi-stages.

Also, JP-A 2004-11050 (KOKAI) discloses a magnetic film prepared by forming a granular magnetic body on a substrate. It is disclosed in this prior art that a granular structure including fine particles consisting of Fe—Pt alloy is formed on a matrix consisting of MgO. According to the method disclosed in this prior art, the granular Fe—Pt alloy particles can be made finer so as to make it possible to obtain a magnetic film capable of magnetic recording at a high density.

Further, a magnetic film obtained by arranging a magnetic body of Fe—Pt alloy on a silicon substrate or a glass substrate is proposed in, for example, "Shouheng Sun et al., SCIENCE 287, 1989-1992 (2000)". The particular magnetic film makes it possible to lower the manufacturing cost because it is possible to use a cheap substrate for manufacturing the magnetic film.

JP-A 2001-358296 (KOKAI) discloses a method of forming separated magnetic crystals on a substrate by removing a uniform magnetic crystalline film formed on a substrate. The uniform magnetic crystalline film is removed from the substrate by means of etching that uses a mask of a prescribed shape. JP-A 2003-289005 (KOKAI) referred to previously also teaches that a granular product is formed on a substrate by a sputtering method. The latter method makes it possible to omit the step of peeling off the magnetic crystal and, thus, wastage of the magnetic material can be avoided.

Further, it is also described in the literature by Shouheng et al. referred to above that island-shaped crystalline bodies are formed on a substrate by coating the substrate with Fe—Pt particles synthesized separately in advance. In this method, it is unnecessary to use a sputtering apparatus and, thus, a magnetic film can be formed easily at a low cost.

As described above, disclosed are various magnetic films having granular FePt materials. In these magnetic films, however, MaO that is deliquescent is used as the substrate material, with the result that the substrate is deformed by water. The deformation of the substrate causes the granular crystalline formed on the substrate to be also deformed at the same time so as to make the magnetic recording unstable. As a result, it is necessary to form a protective film for preventing water from entering the magnetic film. The gap between the head for the magnetic recording in a magnetic film and the magnetic film is increased by the formation of the protective film, with the result that the magnetic information tends to be deteriorated. Also, in the manufacturing process of the magnetic film, it is necessary to employ the step for removing water in order to suppress the deformation of the surface of the substrate made of MaO. It follows that the manufacturing cost of the magnetic film is increased.

On the other hand, deformation caused by water as in the MgO substrate is not generated in the silicon substrate or the glass substrate. However, it is difficult to allow the crystal axis of the FePt alloy to be arranged in a direction adapted for the vertical recording. Such being the situation, an excessive FePt crystalline is required for ensuring a prescribed recording capacity so as to increase the manufacturing cost.

Under the circumstances, it is proposed for the magnetic body positioned on the substrate to be formed of an FePt alloy. The FePt alloy is known to exhibit a strong coercive force. However, the alloy composition of the FePt alloy exhibiting a strong coercive force is limited. To be more specific, an L10 phase is formed in the region where the Fe content is about 50 atomic % so as to exhibit the strongest coercive force, as shown in the phase diagram of the FePt alloy shown in FIG. 4. The coercive force of the alloy is rapidly lowered with deviation of the Fe content from 50 atomic %. Where the magnetic film is applied to a magnetic recording medium, it is difficult to obtain a magnetic recording medium having a desired recording density, if the island-shaped magnetic body deviates from the prescribed composition ratio in the plane of the magnetic recording medium.

In a method of depositing FePt particles on a substrate by, for example, sputtering, the island-shaped magnetic body can be formed excessively on the substrate. Therefore, it is possible to obtain a magnetic recording medium having a desired recording density, even if the island-shaped magnetic body deviates from the prescribed composition ratio. However, the FePt particles deposited by this method are rendered nonuniform in size, with the result that non-uniformity in the recording density is generated by the change in size of the particles of the magnetic body.

BRIEF SUMMARY OF THE INVENTION

According to a first embodiment, there is provided a magnetic film, comprising a platinum layer having a (001) plane orientation and an island-shaped iron-platinum crystalline arranged on the platinum layer and having a (001) plane orientation parallel to the (001) plane orientation of the platinum layer, wherein the island-shaped iron-platinum crystalline has a composition region consisting of 50 atomic % of each of iron and platinum.

Further, according to a second embodiment, there is provided a method of manufacturing a magnetic film, comprising: depositing iron-platinum particles containing iron in an amount exceeding 50 atomic % on a platinum layer having a (001) plane orientation; and heating the platinum layer deposited the iron-platinum particles.

DETAILED DESCRIPTION OF THE INVENTION

A magnetic film according to an embodiment of the present invention will now be described in detail.

A magnetic film according to an embodiment comprises a platinum layer having a (001) plane orientation and an island-shaped iron-platinum crystalline arranged on the platinum layer. The island-shaped iron-platinum crystalline has a (001) plane orientation parallel to the (001) plane orientation of the platinum layer. In other words, the iron-platinum crystalline has a (001) plane orientation equal to the (001) plane orientation of the platinum layer on a plane parallel to the surface of the platinum layer. Also, the island-shaped iron-platinum crystalline has a composition region consisting of 50 atomic % of each of iron and platinum and exhibiting the strongest coercive force.

Figure 1:
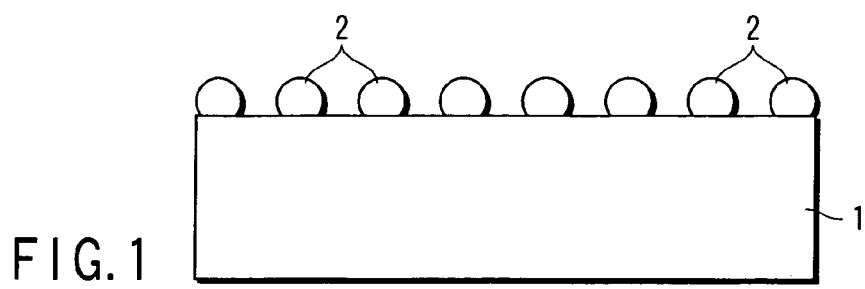
FIG. 1 schematically shows the construction of a magnetic film according to an embodiment.

FIG. 1 schematically shows the construction of the magnetic film according to a typical embodiment. As shown in the drawing, a plurality of iron-platinum crystallines 2 shaped like, for example, balls are arranged on, for example, a crystalline platinum layer 1 having a (001) plane orientation. Each of these iron-platinum crystallines 2 has a (001) plane orientation equal to the (001) plane orientation of the platinum layer 2 on a plane parallel to the surface of the crystalline platinum layer 1. It should be noted that each of the iron-platinum crystallines 2 has a composition region consisting of 50 atomic % of each of iron and platinum.

The platinum layer is formed on the surface of a substrate formed of a material selected from the group consisting of glass, magnesia, alumina, silicon and titanium nitride. Alternatively, the platinum layer is formed of a platinum substrate itself having a (001) plane orientation.

The crystalline platinum layer is formed of a single crystalline platinum layer or a polycrystalline platinum layer.

It is desirable for the island-shaped iron-platinum crystalline to have a platinum concentration gradient such that the platinum concentration in the iron-platinum crystalline is decreased with increase in the regional distance of the crystalline from the platinum layer. In the iron-platinum crystalline having the particular platinum concentration gradient, it is desirable for the composition region consisting of 50 atomic % of each of iron and platinum to be positioned in the vicinity of the center in the direction of the component concentration gradient of the iron-platinum crystalline.

In the iron-platinum crystalline having the particular component concentration gradient, it is desirable for the platinum concentration in the boundary region with the platinum layer to be 50 to 70 atomic %, more desirably 50 to 60 atomic %, and for the platinum concentration on the surface to be 30 to 50 atomic %, more desirably to be 40 to 50 atomic %. The iron-platinum crystalline having the particular component concentration gradient exhibits a higher coercive force.

Each of the iron-platinum crystallines is shaped spherical or columnar and has a flat plane that is in contact with the platinum layer. The columnar crystalline has a polygonal cross-section, e.g., a square, pentagonal or hexagonal cross-section. The iron-platinum crystallines need not have a uniform shape. It is possible for a plurality of different kinds of iron-platinum crystallines differing from each other in the cross-sectional shape to be present together. Where the iron-platinum crystallines are spherical, it is desirable for the distance between the adjacent iron-platinum crystallines to be substantially equal to the diameter of the spherical crystalline.

How to manufacture the magnetic film according to an embodiment will now be described.

In the first step, the platinum layer, e.g., a crystalline platinum substrate, is polished. To be more specific, the surface of a crystalline platinum substrate such as a single crystalline or polycrystalline platinum substrate is polished so as to permit the (001) plane orientation to be exposed. Incidentally, even where a crystalline platinum layer is formed on the surface of a substrate formed of glass, magnesia, alumina, silicon or titanium nitride, the surface of the crystalline platinum layer is polished so as to also permit the (001) plane orientation to be exposed.

In the next step, iron-platinum particles having an iron concentration exceeding 50 atomic % are deposited on the surface of the crystalline platinum substrate. The iron-platinum particles can be obtained by, for example, a gaseous phase synthetic method. It is desirable for the iron-platinum particle to have an iron concentration of 60 to 90 atomic %. In the subsequent heating step, a mutual diffusion (exchange of elements) is generated between the iron atoms in the iron-platinum particle and the platinum atoms in the platinum substrate. In view of the mutual diffusion, the iron content of the iron-platinum particle is selected appropriately from within the range of 60 to 90 atomic % given above. Specifically, it is desirable to use the iron-platinum particle having a lower iron concentration in the case of the heating under low temperatures and to use the iron-platinum particle having a higher iron concentration in the case of the heating under high temperatures.

The iron-platinum particle is shaped spherical or columnar and has a flat plane that is in contact with, for example, the platinum substrate. The columnar iron-platinum particle has a polygonal cross-section, e.g., a square, pentagonal or hexagonal cross-section. The iron-platinum particles need not have a uniform shape. It is possible for a plurality of different kinds of the iron-platinum particles differing from each other in shape to be present together. Where the iron-platinum particles are spherical, it is desirable for the iron-platinum particles to have an average diameter of 2 to 10 nm. Also, where the iron-platinum particles deposited on the crystalline platinum substrate are spherical, it is desirable for the distance between the adjacent iron-platinum particles to be substantially equal to the diameter of the particle.

The iron-platinum particles can be deposited on the crystalline platinum substrate by, for example, coating the platinum substrate with a slurry prepared by dispersing iron-platinum particles in an organic solvent such as hexane, heptane, benzene, toluene or ethanol. After the coating, the slurry is dried so as to permit the iron-platinum particles to be fixed to the crystalline platinum substrate.

In the next step, the crystalline platinum substrate deposited the iron-platinum particles is heated.

It is desirable for the heating to be performed at the temperature of 450 to 640° C., more preferably 450 to 600° C., under a reducing atmosphere or under a vacuum environment. The heating by a heater can be employed as the heating means. In addition, it is also possible to employ the heating by a laser irradiation, an electron beam irradiation or a gamma ray irradiation.

By the heating described above, mutual diffusion is carried out between the iron atoms contained in the iron-platinum particle and the platinum atoms contained in the crystalline platinum substrate. To be more specific, the iron atoms in the iron-platinum particle are migrated by diffusion into the crystalline platinum substrate and, at the same time, the platinum atoms in the crystalline platinum substrate are migrated into the iron-platinum particle so as to perform the exchange of elements. Within the crystalline platinum substrate, the position of the platinum element is fixed in accordance with the direction of the crystal. In the process of the element exchange between iron and platinum, the iron-platinum particle gradually comes to assume a crystal structure similar to that of a crystalline platinum substrate at the interface between the iron-platinum particle and the crystalline platinum substrate. As a result, it is possible to obtain a magnetic film in which the island-shaped iron-platinum crystallines having a (001) plane orientation parallel to the (001) plane orientation of the substrate are arranged on the crystalline platinum substrate having a (001) plane orientation.

Due to the mutual diffusion between the iron atoms contained in the iron-platinum particle and the platinum atoms contained in the crystalline platinum substrate, the iron-platinum crystalline is caused to have a component concentration gradient such that the platinum concentration is increased at the interface with the crystalline platinum substrate and is decreased with increase in the regional distance of the crystalline from the crystalline platinum substrate. It is possible to permit the composition region consisting of 50 atomic % of each of iron and platinum, in which the coercive force is most strongly exhibited, to be present in the component concentration gradient noted above by using the iron-platinum particle having an iron concentration exceeding 50 atomic %, preferably 60 to 90 atomic %.

The magnetic film according to the embodiment described above exhibits a vertical magnetic anisotropy having a high coercive force in a direction perpendicular to the surface of the platinum layer. In the case of using the particular magnetic film, the amount of the iron-platinum crystalline required for preparing a magnetic recording medium having a desired density is not larger than half the amount of that used in the conventional magnetic film, i.e., the island-shaped magnetic body having a uniform composition. It follows that the manufacturing cost can be lowered in the case of using the magnetic film of the present invention.

It should also be noted that the magnetic film manufactured by the method of the embodiment exhibits a vertical magnetic anisotropy having a high coercive force in a direction perpendicular to the surface of the platinum layer, though the amount of the magnetic substance used is not larger than ⅓ of the amount required for the manufacture of the magnetic film by the conventional method of etching a thin magnetic film. It follows that the magnetic film having a desired density and used for the manufacture of a magnetic recording medium can be manufactured at a low cost.

Examples of the present invention will now be described. Needless to say, the following Examples are intended to set forth more clearly the technical idea of the present invention and do not limit the technical scope of the present invention.

EXAMPLE 1

A slurry of iron-platinum particles was prepared in advance by dispersing in hexane 10% by weight of iron-platinum particles having an iron content of 80 atomic % and having an average particle diameter of 3 nm. Then, the surface of a single crystalline platinum substrate was polished in a manner to expose the (001) plane orientation, followed by coating the polished single crystalline platinum substrate with the slurry of the iron-platinum particles. Further, the coated slurry was dried for a prescribed time so as to fix the iron-platinum particles to the single crystalline platinum substrate. The iron-platinum particles after the drying were observed with an electron microscope. As a result, the iron-platinum particles were found to have been equidistantly arranged about 3 nm apart from each other.

In the next step, the single crystalline platinum substrate having the iron-platinum particles dried and fixed thereto was heated at a heating rate of 100° C./min under a hydrogen gas atmosphere. The heated substrate was retained at 550° C. for 30 minutes. By this heating, obtained was a magnetic film, in which granular iron-platinum crystallines having an average diameter of about 3 nm were equidistantly arranged apart from each other by about 3 nm on the single crystalline platinum substrate having a (001) plane orientation. In the magnetic film thus obtained, the (001) plane orientation of the iron-platinum crystalline was found to be parallel to the (001) plane orientation of the single crystalline platinum substrate.

The magnetic film thus obtained was cut across the granular iron-platinum crystalline in a direction perpendicular to the surface of the single crystalline platinum substrate so as to carry out composition analysis by energy dispersion type X-ray spectroscopy using a transmission type electron microscope over the surface from the interface between the iron-platinum crystalline and the platinum substrate. As a result, the iron-platinum crystalline was found to have a concentration gradient of platinum such that the iron-platinum crystalline contained 60 atomic % of platinum at the interface with the crystalline platinum substrate, and 40 atomic % of platinum on the surface. Further, the platinum content was decreased with increase in the regional distance of the iron-platinum crystalline from the platinum substrate in a direction perpendicular to the surface of the platinum substrate. The composition region of (Fe:Pt=50:50) was included in the component concentration gradient noted above.

Figure 2:
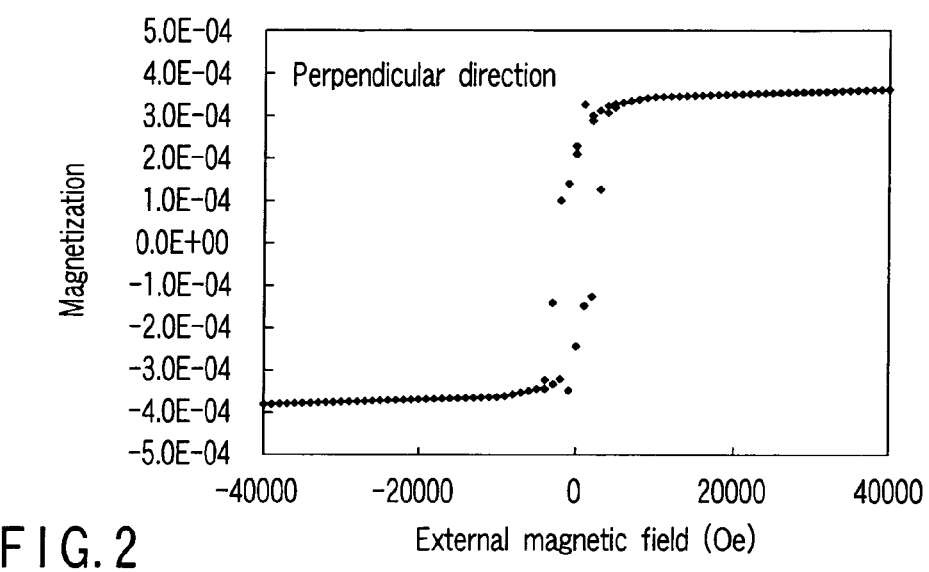
FIG. 2 is a graph showing the relationship between the magnetization and the external magnetic field, covering the case where an external magnetic field was applied to the magnetic film for Example 1 for measuring the magnetization in a direction perpendicular to the surface of the single crystalline platinum substrate.
Figure 3:
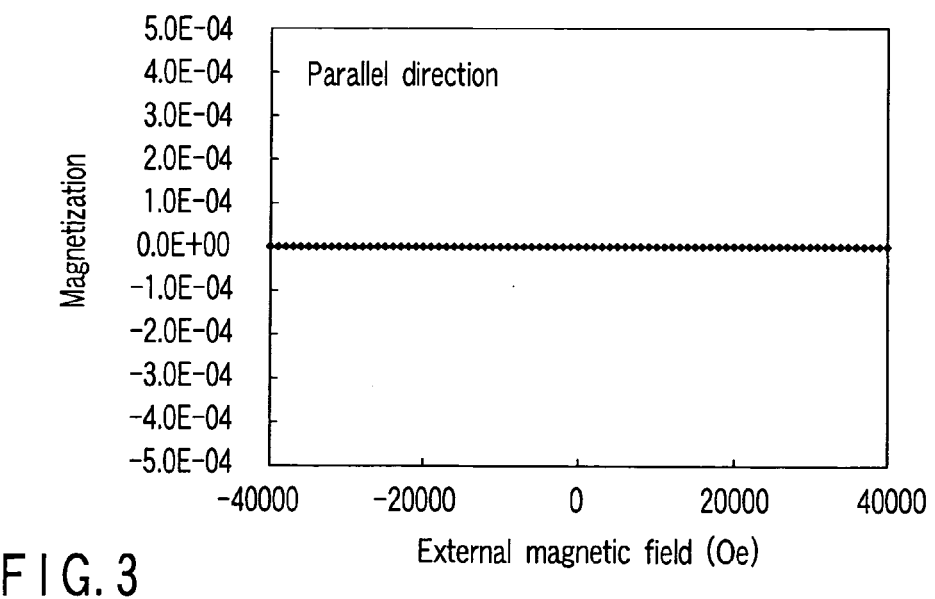
FIG. 3 is graph showing the relationship between the magnetization and the external magnetic field, covering the case where an external magnetic field was applied to the magnetic film for Example 1 for measuring the magnetization in a direction parallel to the surface of the single crystalline platinum substrate.

An external magnetic field was applied to the magnetic film thus obtained so as to measure the magnetization of the magnetic film in a direction perpendicular or parallel to the surface of the single crystalline platinum substrate. FIG. 2 shows the magnetization in a direction perpendicular to the external magnetic field, and FIG. 3 shows the magnetization in a direction parallel to the external magnetic field. As apparent from FIGS. 2 and 3, the magnetic film for Example 1 was found to have been magnetized only in a direction perpendicular to the surface of the single crystalline platinum substrate. The coercive force in this case was found to 5 kOe.

EXAMPLES 2 TO 7 AND REFERENCE EXAMPLE 1

Seven kinds of slurries of FePt particles were prepared by dispersing in hexane 10% by weight of FePt particles of the Fe—Pt composition shown in Table 1 and having an average particle diameter of 3 nm (5 nm for Example 6). Then, the surface of a single crystalline platinum substrate was polished in a manner to expose the (001) plane orientation, followed by coating the single crystalline platinum substrate with the slurry noted above. Further, the slurry was dried for a prescribed time so as to fix the layer of the FePt particles to the single crystalline platinum substrate. The FePt particles after the drying were observed with an electron microscope. The FePt particles were found to have been equidistantly arranged on the platinum substrate about 3 nm apart from each other. Incidentally, in Example 6, the FePt particles having an average particle diameter of 5 nm were found to have been equidistantly arranged on the platinum substrate about 5 nm apart from each other.

In the next step, the single crystalline platinum substrate having the FePt particles dried and fixed thereto were heated at a heating rate of 100° C./min within a hydrogen atmosphere and retained at the temperature shown in Table 1 for 30 minutes. By this heating, obtained was a magnetic film, in which granular iron-platinum crystallines having an average diameter of about 3 nm were equidistantly arranged apart from each other by about 3 nm on the single crystalline platinum substrate having a (001) plane orientation. In the magnetic film thus obtained, the (001) plane orientation of the iron-platinum crystalline was parallel to the (001) plane orientation of the single crystalline platinum substrate. Incidentally, in Example 6, the FePt crystallines having an average particle diameter of 5 nm were found to have been equidistantly arranged on the platinum substrate apart from each other by about 5 nm.

COMPARATIVE EXAMPLES 1 TO 3

A slurry of iron-platinum particles was prepared by dispersing in hexane 10% by weight of FePt particles containing 50 atomic % of iron and having an average particle diameter of 3 nm. On the other hand, each of an MgO substrate, a TiN substrate and a Si substrate was polished in a manner to expose the (001) plane orientation of each of these substrates. Then, each of these polished substrates was coated with the slurry noted above, followed by drying the coated slurry for a prescribed time so as to fix the layer of the FePt particles to each of these substrates. The FePt particles after the drying were observed with an electron microscope. As a result, the FePt particles were found to have been equidistantly arranged on the substrate about 3 nm apart from each other in each of the three cases.

In the next step, each of the substrates having the FePt particles dried and fixed thereto was heated at a heating rate of 100° C./min within a hydrogen gas atmosphere and retained at 550° C. for 30 minutes. By this heating, obtained was a magnetic film, in which the FePt crystallines having an average particle diameter of 3 nm and having a crystal direction shown in Table 1 were found to have been equidistantly arranged about 3 nm apart from each other on each of the substrates.

The magnetic film obtained in each of Examples 2 to 7, Reference Example 1 and Comparative Examples 1 to 3 was cut across the granular iron-platinum crystalline in a direction perpendicular to the surface of the single crystalline platinum substrate. The cutting was carried out so as to look into the platinum concentration at the interface of the iron-platinum crystalline with the single crystalline platinum substrate, into the platinum concentration on the surface, and into the presence of the composition region of (Fe:Pt=50:50). Employed for this purpose was energy dispersion type X-ray spectroscopy, using a transmission type electron microscope. Also, the platinum concentration was examined over the surface of the iron-platinum crystalline extending from the interface of the iron-platinum crystalline with the platinum substrate. Table 1 shows the result. Incidentally, the iron-platinum crystalline in each of Examples 2 to 7 and Reference Example 1 was found to have a concentration gradient of platinum such that the platinum concentration was decreased with increase in the regional distance of the iron-platinum crystalline from the platinum substrate in a direction perpendicular to the surface of the single crystalline platinum substrate. Incidentally, Table 1 indicates, "interface/surface Pt amount (atomic %) of, for example, 60/40". The indication denotes that the composition by atomic % at the interface between the platinum substrate and the iron-platinum crystalline was Fe:Pt=40:60, and that the composition on the surface of the iron-platinum crystalline was Fe:Pt=60:40.

Also, an external magnetic field was applied to the magnetic film obtained in each of Examples 2 to 7, Reference Example 1 and Comparative Examples 1 to 3 so as to measure the coercive force in a direction perpendicular or parallel to the surface of the single crystalline platinum substrate. The coercive force that was measured was generated by the magnetization of the magnetic film in the direction perpendicular or parallel to the surface of the single crystalline platinum substrate. Table 1 also shows the result.

Incidentally, Table 1 also shows the experimental data for Example 1.

TABLE 1

| | Manufacturing conditions | | | Magnetic film | | | | |
|---|---|---|---|---|---|---|---|---|
| | | Particle | | | FePt crystalline | | | |
| | | FePt | diameter/ | | | Pt amount | | Coercive force |
| | | composition | distance | | | | | |
| | Substrate | of FePt particle (atomic %) | between adjacent particles | Heating temperature (° C.) | Crystal orientation | (atomic %) at interface/ surface | Presence of 50% Fe—50% Pt region | Perpendicular direction (kOe) | Parallel direction (kOe) |
|---|---|---|---|---|---|---|---|---|---|
| Example 1 | (001)Pt | 80:20 | 3 nm/3 nm | 550 | (001) | 60/40 | Present | 5 | 0 |
| Example 2 | (001)Pt | 90:10 | 3 nm/3 nm | 550 | (001) | 50/30 | Present | 1 | 0 |
| Example 3 | (001)Pt | 70:30 | 3 nm/3 nm | 550 | (001) | 65/45 | Present | 3 | 0 |
| Example 4 | (001)Pt | 90:10 | 3 nm/3 nm | 600 | (001) | 55/35 | Present | 3 | 0 |
| Example 5 | (001)Pt | 80:20 | 3 nm/3 nm | 600 | (001) | 70/50 | Present | 1 | 0 |
| Example 6 | (001)Pt | 80:20 | 5 nm/5 nm | 600 | (001) | 55/35 | Present | 3 | 0 |
| Example 7 | (001)Pt | 60:40 | 3 nm/3 nm | 450 | (001) | 55/35 | Present | 3 | 0 |
| Reference Example 1 | (001)Pt | 50:50 | 3 nm/3 nm | 550 | (001) | 80/60 | None | 0 | 0 |
| Comparative Example 1 | (001)MgO | 50:50 | 3 nm/3 nm | 550 | Random | 50/50 | Present | 2 | 2 |
| Comparative Example 2 | (001)TiN | 50:50 | 3 nm/3 nm | 550 | Random | 50/50 | Present | 2 | 2 |
| Comparative Example 3 | (100)Si | 50:50 | 3 nm/3 nm | 550 | Random | 50/50 | Present | 2 | 2 |

Figure 4:
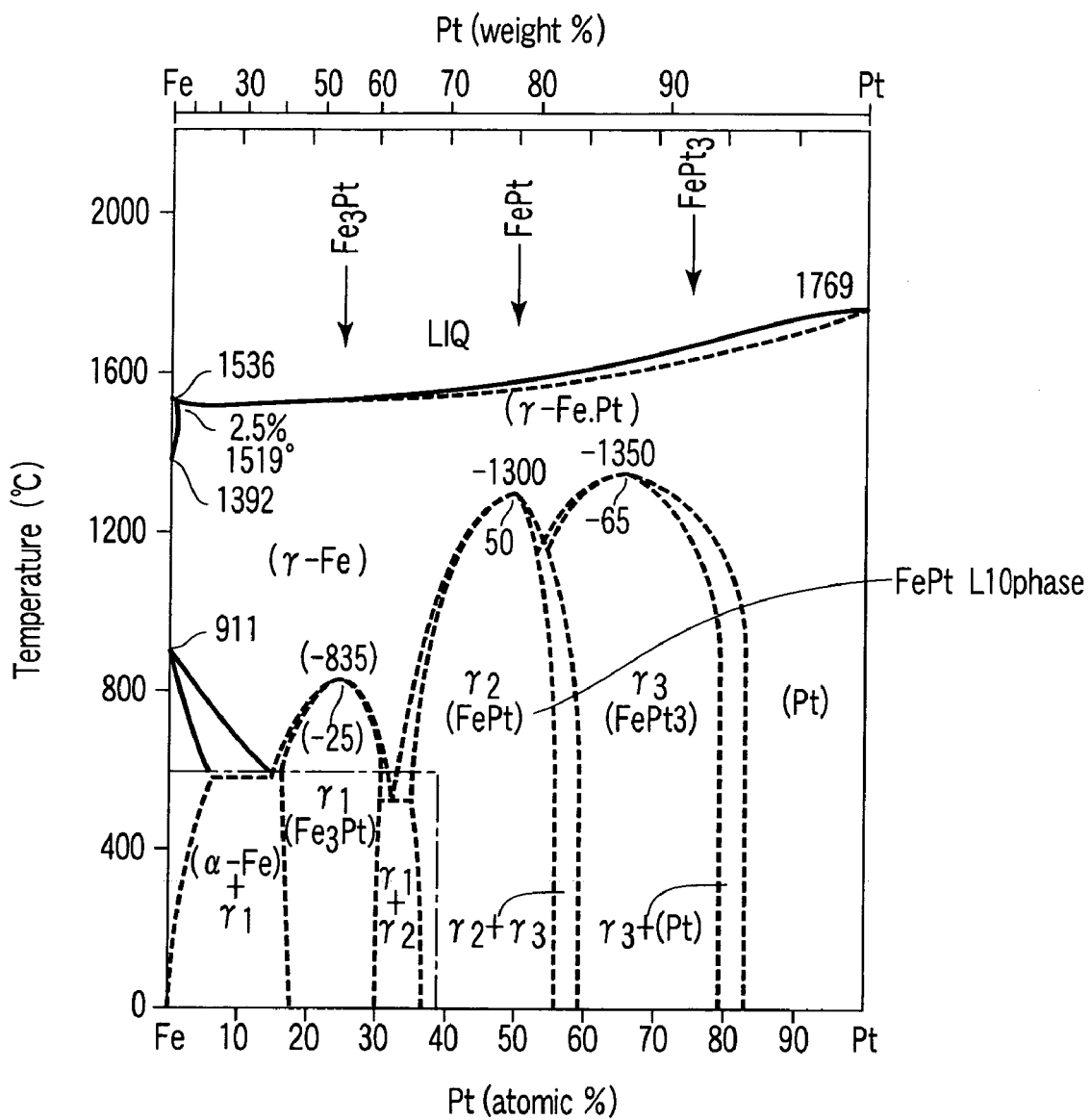
FIG. 4 is a composition diagram of Fe—Pt alloys.

As apparent from Table 1, the composition region of Fe:Pt=50:50 was included in the Pt concentration gradient of the FePt crystalline in the magnetic film obtained in each of Examples 1 to 7 so as to confirm that the magnetic film exhibits a strong coercive force derived from the formation of the L10 phase given in the diagram of FIG. 4. In particular, the composition region of Fe:Pt=50:50 was formed in the vicinity of the center of the Pt concentration gradient of the FePt crystalline in the magnetic film obtained in Example 1, with the result that the magnetic film obtained in Example 1 was allowed to exhibit a stronger coercive force in only the direction perpendicular to the surface of the substrate.

On the other hand, in the magnetic film for Reference Example 1, which was manufactured by using FePt particles having a Fe:Pt composition of 50:50 (atomic %), the FePt crystalline certainly exhibited a Pt concentration gradient. However, the composition region of Fe:Pt=50:50 (atomic %) was not included in the Pt concentration gradient. In other words, the L10 phase of FePt equal to that given in the diagram of FIG. 4, which was referred to previously, was not formed, with the result that the coercive force was found to be zero in each of the perpendicular direction and the parallel direction.

In the magnetic film for each of Comparative Examples 1 to 3, in which a MaO substrate, a TiN substrate and a Si substrate were used, respectively, the FePt crystallines were not aligned with the plane orientation of the substrate. The magnetic film for each of these Comparative Examples certainly included the composition of Fe:Pt=50:50 in the entire region in a direction perpendicular to the substrate. However, the magnetic film exhibited a coercive force in each of the directions perpendicular and parallel to the substrate, resulting in failure to exhibit a perpendicular magnetic anisotropy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a magnetic film, the method comprising:
    depositing iron-platinum particles containing iron in an amount exceeding 50 atomic % on a single crystalline platinum substrate having a (001) plane orientation; and
    heating the platinum substrate having the iron-platinum particles at a temperature of 450 to 640 degrees Celsius under a reducing atmosphere or a vacuum environment, thereby forming island-shaped iron-platinum crystallines on the platinum substrate, the crystallines having a (001) plane orientation that is parallel to the (001) plane orientation of the platinum substrate and the crystallines having a composition region consisting of 50 atomic % of each of iron and platinum in a direction of a thickness of the crystallines.

2. The method according to claim 1, wherein the iron-platinum particle contains 60 to 90 atomic % of iron.

3. The method according to claim 1, wherein deposition of the iron-platinum particles on the platinum substrate is carried out by the process including the step of coating the platinum substrate with a liquid material containing the iron-platinum particles.

4. A method of manufacturing a magnetic film, the method comprising:
    polishing a single crystalline platinum substrate so as to permit a (001) plane orientation to be exposed;
    depositing iron-platinum particles on a surface of the platinum substrate, the iron-platinum particles having an iron concentration exceeding 50 atomic %;
    heating the platinum substrate having the iron-platinum particles thereon to a temperature of 450 to 640 degrees Celsius to form iron-platinum crystallines having a platinum concentration gradient that increases at an interface with the platinum substrate and decreases as a distance from the platinum substrate increases.

5. The method according to claim 4, wherein the depositing step comprises depositing the iron-platinum particles with an iron concentration of 60 to 90 atomic %.

6. The method according to claim 4, wherein the depositing step comprises depositing the iron-platinum particles with a spherical shape having a flat plane that is in contact with the platinum substrate.

7. The method according to claim 6, wherein the depositing step comprises depositing the iron-platinum particles to an average diameter of 2 to 10 nm.

8. The method according to claim 6, wherein the depositing step comprises depositing the iron-platinum particles so that a distance between adjacent iron-platinum particles is substantially equal to a diameter of the spherical shape.

9. The method according to claim 4, wherein the depositing step comprises depositing the iron-platinum particles with a columnar shape having a flat plane that is in contact with the platinum substrate.

10. The method according to claim 9, wherein the depositing step comprises depositing the iron-platinum particles with a polygonal cross-section.

11. The method according to claim 10, wherein the polygonal cross-section is a shape selected from the group consisting of a square, a pentagon, and a hexagon.

12. The method according to claim 4, wherein the depositing step comprises:
dispersing the iron-platinum particles in an organic solvent to form a slurry;
coating the platinum substrate with the slurry; and
allowing the slurry to dry so that the iron-platinum particles are fixed to the platinum substrate.

13. The method according to claim 4, wherein the heating step comprises heating by laser irradiation.

14. The method according to claim 4, wherein the heating step comprises heating by electron beam irradiation.

15. The method according to claim 4, wherein the heating step comprises heating by gamma ray irradiation.

16. The method according to claim 4, wherein the heating step comprises heating under a reducing atmosphere.

17. The method according to claim 4, wherein the heating step comprises heating under a vacuum environment.

* * * * *